United States Patent
Eslambolchi et al.

(10) Patent No.: US 6,735,875 B1
(45) Date of Patent: May 18, 2004

(54) TOOL FOR REMOVING DUCT SURROUNDING A FIBER OPTIC CABLE

(75) Inventors: Hossein Eslambolchi, Los Altos Hills, CA (US); John Sinclair Huffman, Conyers, GA (US)

(73) Assignee: AT&T Corp., New York, NY (US)

( * ) Notice: Subject to any disclaimer, the term of this patent is extended or adjusted under 35 U.S.C. 154(b) by 70 days.

(21) Appl. No.: 10/155,641

(22) Filed: May 22, 2002

(51) Int. Cl.⁷ .................................................. B27B 9/02
(52) U.S. Cl. .......................................... 30/377; 30/391
(58) Field of Search .......................... 30/371, 373, 375, 30/377, 390, 391, 376; 83/13

(56) References Cited

U.S. PATENT DOCUMENTS

| | | | |
|---|---|---|---|
| 3,721,141 A | * | 3/1973 | Frostad ........................ 30/391 |
| 3,722,496 A | * | 3/1973 | Schuman ...................... 30/376 |
| 3,730,239 A | * | 5/1973 | Kaman et al. ................. 30/391 |
| 3,802,080 A | * | 4/1974 | Peter ............................ 30/377 |
| 4,347,634 A | | 9/1982 | Sawan |
| 4,856,394 A | * | 8/1989 | Clowers ....................... 30/376 |
| 4,982,501 A | * | 1/1991 | Sauerwein et al. ........... 30/376 |
| 5,570,511 A | | 11/1996 | Reich et al. |
| 5,588,213 A | * | 12/1996 | Swanberg ..................... 30/391 |
| 6,161,293 A | * | 12/2000 | Watson ........................ 30/377 |

* cited by examiner

Primary Examiner—Hwei-Siu Payer

(57) ABSTRACT

A hand-held tool for quickly and easily removing duct material surrounding a fiber optic cable. The tool contains a motorized saw blade, with an adjustable depth of cut gauge formed integral with the cutting floor. In use, a technician first determines the thickness of a particular duct to be removed, then adjusts the depth of cut for the saw blade to provide the desired cut without damaging the underlying fibers. Once adjusted, the technician can then turn on the tool, which activates the saw blade and effectuates the desired cut (either axial or radial).

8 Claims, 2 Drawing Sheets

TOOL FOR REMOVING DUCT SURROUNDING A FIBER OPTIC CABLE

TECHNICAL FIELD

The present invention relates to a tool for removing plastic duct material surrounding a fiber optic cable and, more particularly, to a hand-held saw with an adjustable blade depth guide to allow for a variety of different duct materials to be removed without cutting into the underlying fiber cables.

BACKGROUND OF THE INVENTION

During restoration of a failed fiber optic line, repair time is critical, due to the massive amount of service that is affected by the failure. Some fiber optic cables may handle as many as a million circuits of communication traffic, which will all be "failed" until restoration of service is achieved by splicing together the failed fibers. Quickly getting access to the fibers for restoration and placing a restoration splice into the failed fibers will reduce the number of blocked calls, as well as the length of the service outage.

In most cases, fiber optic cables are installed in ducts that are placed in underground right-of-ways, where the plastic duct material (usually an HDPE material) will protect the cables from the harsh environment. Although this duct material works well in protecting the cable, it usually comprises a relatively hard composition that is difficult to remove when a technician needs to gain access to a failed cable. The prior art removal process calls for the use of hand tools, such as a pair of heavy-duty shears, to cut away the duct in the region of the cable failure. These tools are cumbersome to use, where a technician may often need up to an hour to remove a duct from around the cable. Thus, a need remains in the art for a tool that a field technician can use to quickly and easily remove the duct from around a failed fiber cable.

SUMMARY OF THE INVENTION

The need remaining in the prior art is addressed by the present invention, which relates to a tool for removing plastic duct material surrounding a fiber optic cable and, more particularly, to a hand-held, motorized saw with an adjustable blade depth guide to allow for a variety of different thicknesses of duct material to be removed without cutting into the underlying fiber cables.

In accordance with the present invention, a hand-held saw is formed to include an adjustable depth guide to control the depth a saw blade extends below the tool, thus adjusting the cut depth for different thicknesses of duct material. In one embodiment, a set of four adjustable positions is used. A locking pin connected between a saw blade cover and the depth guide may be used to lock in and control the depth of cut of the tool. The tool may be oriented with respect to the duct so as to allow for either radial or axial cuts to be made.

Advantageously, the use of an adjustable depth cut allows for various types and thicknesses of duct material to be cut away without cutting into or damaging the underlying fibers within the cable. Moreover, the use of a motorized saw allows for the cut to be made quickly and efficiently.

Other and further advantages of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
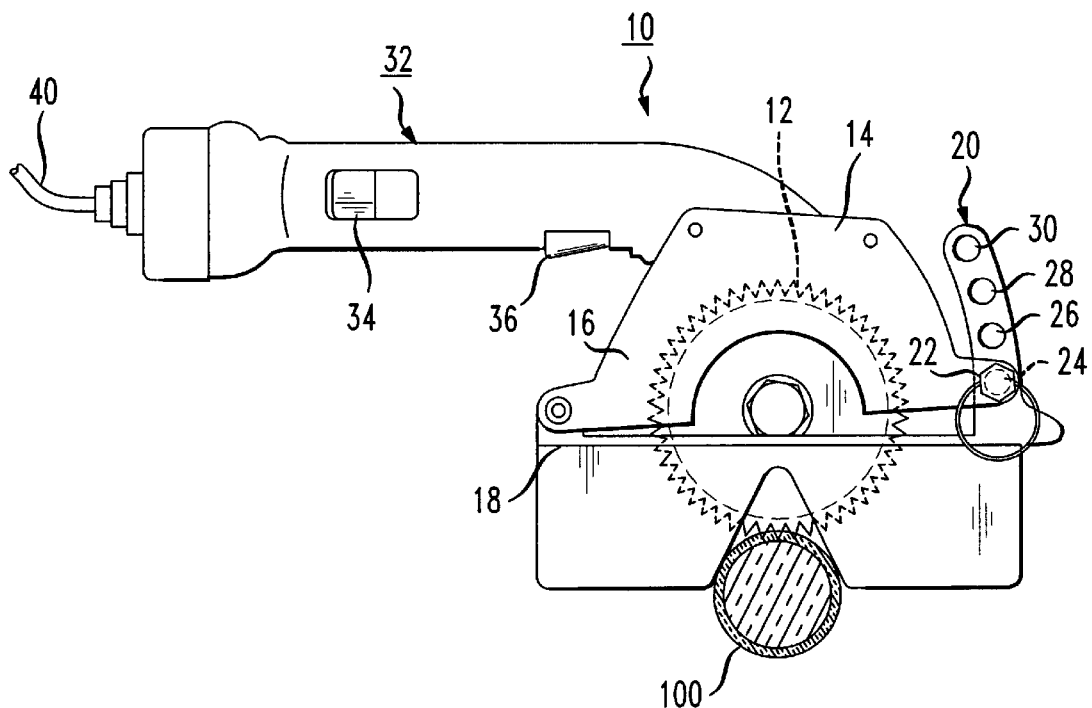
FIG. 1 contains a side view of an exemplary hand-held adjustable duct cutting tool of the present invention, with the blade in a first, lowest position.
Figure 2:
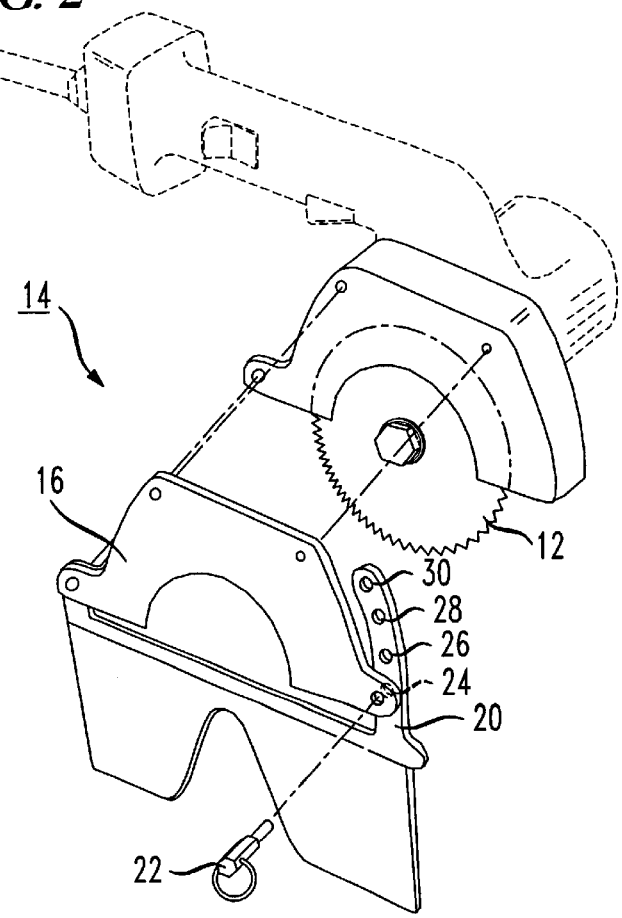
FIG. 2 contains an exploded view of the saw portion of the tool of FIG. 1.

FIG. 1 illustrates an exemplary duct cutting tool 10 formed in accordance with the present invention. Cutting tool 10 contains a saw blade 12 mounted in an adjustable frame 14, where adjustable frame 14 includes a rotatable upper housing 16, cutting platform 18, and a depth adjustment guide 20 disposed at one end and integral with cutting platform 18. Referring to the exploded view of the adjustable frame portion 14 of tool 10, the relationship between upper housing 16 and depth adjustment guide 20 is clearly shown. In this particular embodiment, a locking pin 22 is associated with upper housing 16 and passes through an adjustment aperture on guide 20 to provide for the proper depth of cut. That is, depth adjustment guide 20 is formed to include a desired number of apertures along its extent, where in this particular arrangement a set of four apertures 24, 26, 28 and 30 are shown. Locking pin 22 is fixed with and attached to upper housing 16 and can therefore be inserted in the proper aperture 24, 26, 28 or 30 to provide the predetermined depth of cut through the plastic duct housing surrounding a fiber optic cable.

Referring back to FIG. 1, an exemplary cable duct 100 is shown as positioned below tool 10. With locking pin 22 in its lowest position, as shown, saw blade 12 will exactly and precisely cut through duct 100 without cutting further into the interior of duct 100. As discussed below, tool 10 of the present invention may be used to make a radial cut around the perimeter of a duct, as shown in FIG. 1. Alternatively, tool 10 may also be used to make an axial cut along a selected length of duct.

Figure 3:
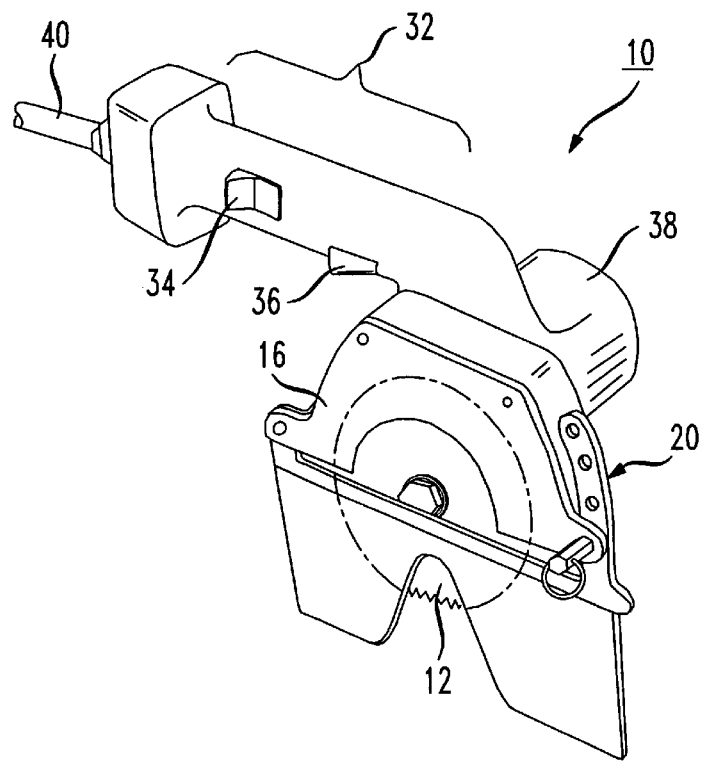
FIG. 3 contains an isometric view of the tool of FIG. 1.

FIG. 1 shows tool 10 being hand-held (the hand shown in phantom) by virtue of a handle section 32, where handle 32 includes an on/off power switch 34 and a blade activation control 36. A blade motor 38, as seen in the isometric view of FIG. 3, is attached to handle section 32, where electrical power to tool 10 is provided through, in this example, a power cord 40 attached between motor 38 and an AC power source. Alternatively, a battery supply may be used to deliver power to motor 38, where the battery supply may be incorporated within handle section 32.

Figure 4:
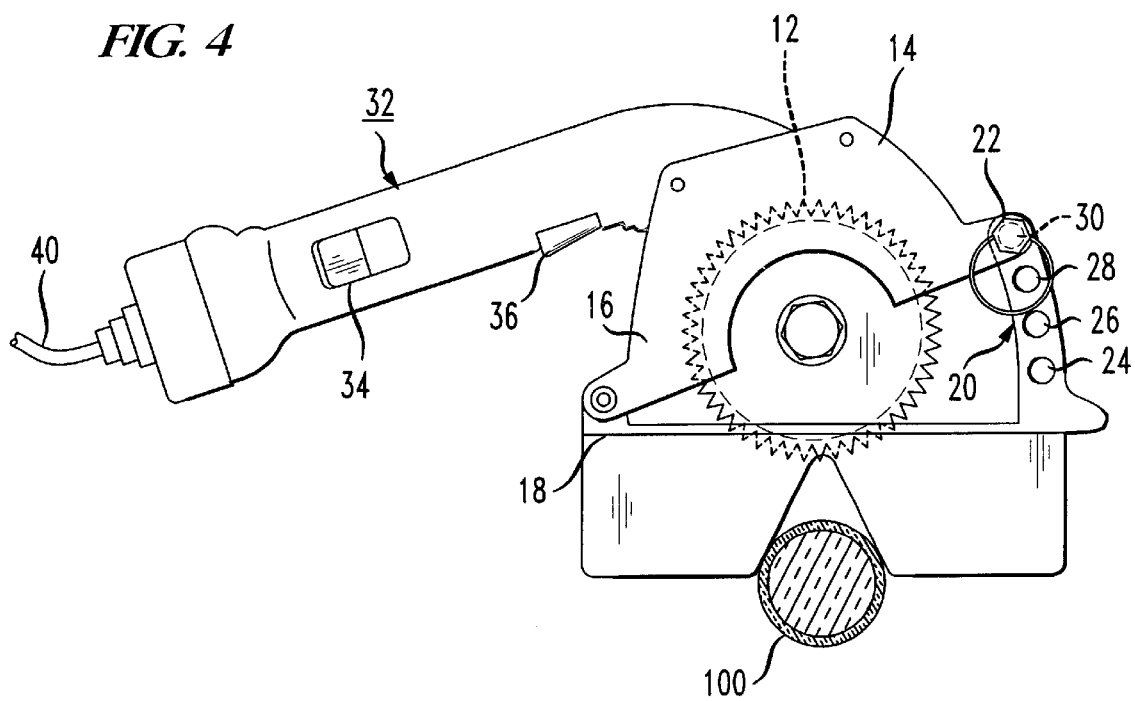
FIG. 4 contains a side of the exemplary hand-held adjustable duct cutting tool of the present invention, with the blade in the highest cutting position.

FIG. 4 illustrates tool 10 of FIG. 1 with blade 12 adjusted so that locking pin 22 is positioned within top aperture 30 of depth adjustment guide 20, where this adjustment is used to cut through a relatively thin layer of duct material (as opposed to the depth of cut associated with bottom aperture 24). In this position, therefore, blade 12 will generate a minimal depth cut into a plastic duct casing surrounding a fiber optic cable.

In operation of tool 10, a technician first determines the proper depth of cut required to remove a plastic duct casing, then adjusts the position of locking pin 22 in depth adjustment guide 20 to provide the determined depth of cut. As mentioned above, by being able to accurately control the depth of cut, hand-held cutting tool 10 of the present invention prevents the technician from cutting too far into a fiber optic cable, where a deep cut may result in damaging the individual optical fibers. Once the saw blade is at the proper depth, the technician can then turn on tool 10 (using, for example ON/OFF switch 34) and activate blade 12 to be begin rotating. Depending on the orientation of the duct with respect to the tool, a radial cut around the circumference of the duct or an axial cut along a length of the duct may be made. Since the inventive tool is power-driven (yet small enough to be hand held), the cutting process is both quick and accurate, which results in reducing the time needed to remove the duct from around a section of damaged fiber.

The present invention has been described with reference to a particular embodiment. Modifications and alterations will occur to others upon reading and understanding this specification taken together with the drawings. The embodiments are to be but examples, and various alternatives, modifications, variations or improvements may be made by those skilled in the art from this teaching which are intended to be encompassed by the following claims.

What is claimed is:

1. A method of cutting into a duct material encapsulating fiber optic cabling, the method comprising the steps of:

a) providing a hand-held, motorized tool for removing duct material without damaging the cabling within the duct material, the tool comprising a saw blade, controlled by an activation switch and connected to a motor assembly, a cutting frame including an adjustable depth of cut fixture, rotatably connected to said saw blade such that the depth of cut of said saw blade is controlled by said adjustable depth of cut fixture, said cutting frame comprising an upper housing surrounding and protecting an upper portion of the saw blade and a cutting floor of a predetermined length greater than the diameter of the said blade, said cutting floor connected, at a first end, as a pivot point to said upper housing, wherein the adjustable depth of cut fixture is attached to a second, opposite end of the cutting floor, and a handle portion, supporting the motor assembly and connected to a power source for said motor assembly, said handle portion connected to said cutting frame;

b) determining the thickness of the duct material;

c) adjusting the depth of cut on said adjustable depth of cut fixture, using the pivot point to essentially match the determined duct material thickness; and d) turning on said tool to activate said saw blade and generate the cutting action into said duct material.

2. The method as defined in claim 1 wherein the method includes the step of orienting the duct material with respect to the tool to generate a radial cut around the periphery of the duct material.

3. The method as defined in claim 1 wherein the method includes the step of orienting the duct with respect to the tool to generate an axial cut along a length of the duct.

4. A hand-held, motorized tool for removing duct material without damaging cabling within the duct material, the tool comprising a saw blade, controlled by an activation switch connected to an energy source;

a motor assembly for providing rotational movement to said saw blade, with said activation switch connected to said motor assembly;

a cutting frame including an adjustable depth of cut fixture, rotatably connected to said saw blade such that the depth of cut of said saw blade is controlled by said adjustable depth of cut fixture, wherein the cutting frame further comprises an upper housing surrounding and protecting an upper portion of the saw blade; and a cutting floor of a predetermined length greater than the diameter of the said saw blade, said cutting floor connected, at a first end, as a pivot point to said upper housing, wherein the adjustable depth of cut fixture is attached to a second, opposite end of the cutting floor; and a handle portion, supporting the motor assembly and connected to a power source for said motor assembly, said handle portion connected to said cutting frame.

5. A hand-held, motorized tool as defined in claim 4 wherein the upper housing further comprises a locking pin and the adjustable depth of cut fixture comprises an extension with a predetermined number of apertures so that upon pivoting the cutting floor with respect to the upper housing, the locking pin is inserted in an appropriate aperture to define a desired depth of cut.

6. A hand-held, motorized tool as defined in claim 5 wherein the adjustable depth of cut fixture extension includes a set of four apertures.

7. A hand-held, motorized tool as defined in claim 4 wherein the energy source comprises a battery source disposed within the handle portion of said tool.

8. A hand-held, motorized tool as defined in claim 4 wherein an AC energy source is used.

* * * * *